E. J. BERGMAN.
DEMOUNTABLE RIM FASTENER.
APPLICATION FILED MAR. 27, 1918.

1,308,616.

Patented July 1, 1919.

Edmond J. Bergman
Inventor

By Geo. Kimmel
Attorney

UNITED STATES PATENT OFFICE.

EDMOND J. BERGMAN, OF VINCENNES, INDIANA.

DEMOUNTABLE-RIM FASTENER.

1,308,616.　　　　Specification of Letters Patent.　　Patented July 1, 1919.

Application filed March 27, 1918. Serial No. 224,990.

*To all whom it may concern:*

Be it known that I, EDMOND J. BERGMAN, a citizen of the United States, residing at Vincennes, in the county of Knox and State of Indiana, have invented certain new and useful Improvements in Demountable-Rim Fasteners, of which the following is a specification.

This invention relates to new and useful improvements in demountable rims, and the primary object of the invention is to provide a vehicle wheel provided with a demountable tire carrying rim that is secured to the fixed rim of the wheel by novel type of fastening means, that is detachably connected with the wheel, and when removed it is adapted to carry the demountable rim therewith so as to facilitate the removal of a tire from the wheel.

Another object of the invention is to provide a device of this character which is easily and simply constructed, inexpensive to manufacture, and one which will be very efficient in operation.

With these and numerous other objects in view, my invention consists of the novel features of construction, combination, and arrangement of parts which will be herein referred to and more particularly pointed out in the specification and claims.

In the accompanying drawings.

In describing my invention, I shall refer to the drawings in which similar reference characters designate corresponding parts throughout the several views.

The numeral 1 designates the fixed rim of a vehicle wheel said wheel being of the conventional construction, and the fixed rim thereof having a smooth outer periphery as clearly illustrated in the accompanying drawings. The demountable tire carrying rim 2 is of the conventional construction, and is adapted to be positioned on the smooth outer periphery of the fixed rim 1, as is common to this general type of device. My invention resides in new and novel means for detachably connecting the demountable rim to the fixed rim and facilitating the removal or replacing of the same thereon.

Figure 1:
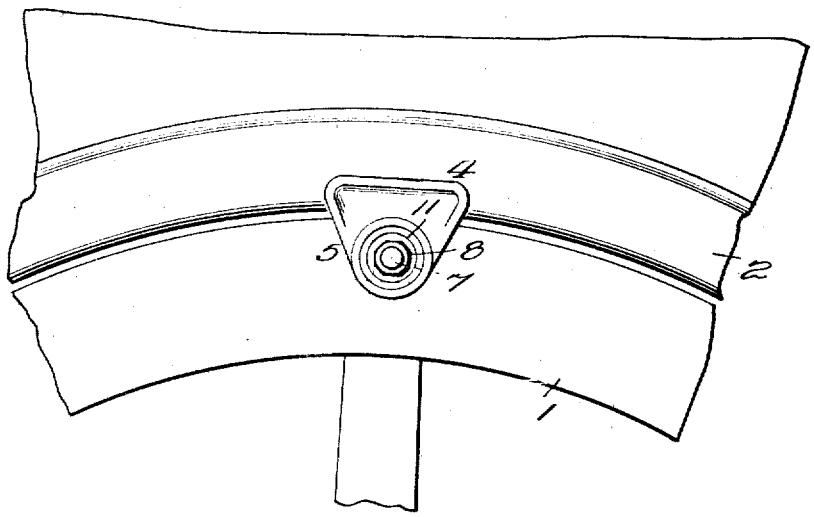
Figure 1 is a fragmental section of the device.
Figure 2:
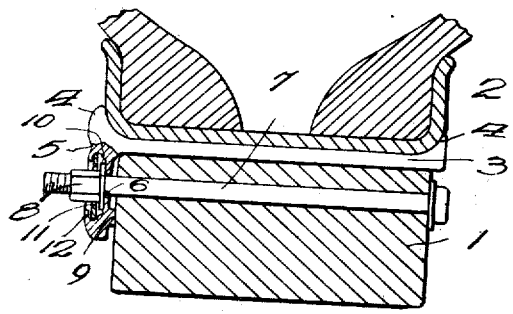
Fig. 2 is a transverse section through the wheel rim.

The means employed comprises a transverse securing strip 3 that extends across between the outer face of the fixed rim and the inner face of the demountable rim, said strip being adapted to be interposed therebetween when the parts are in position as is clearly shown in Fig. 2 of the drawings. The inner face of the strip 3 is smooth, and is slidable on the periphery of the fixed rim 1, while the outer face thereof has its opposite ends curved outwardly as shown at 4, to form a seat adapted to receive the demountable rim 2 thereon. The outer end of the strip 3, is provided with means for detachably connecting the same to the fixed rim 1 as will be hereinafter more fully described.

This connecting means comprises an integral inwardly extending lug 5 that extends downwardly adjacent the outer side of the fixed rim 1 and which is provided with an aperture 6 therethrough adjacent its inner end. The aperture 6 alines with a transverse opening through the fixed rim 1, adapted to receive a bolt 7 that has its outer end externally threaded and projecting through the aperture 6.

The bolt 7 that is positioned through the fixed rim 1 is rigidly secured therein and the end that projects from the side of said rim extends outwardly for a considerable distance, as is clearly shown in the accompanying drawings, for a purpose to be hereinafter more fully described. The inner face of the lug 5 is provided with a spacing member 9 that will space said lug a short distance from the adjacent side of the fixed rim.

Connected with the outer face of the lug 5 is a nut 8 that is adapted to be mounted on the projecting end of the bolt 7 said nut 8 being provided with a base flange 12 projecting therefrom, and mounted in a recess 10 in the outer face of said lug. The projecting flange 12 of the nut 8 is held in said recess by a locking ring 11 as clearly illustrated in Fig. 2 of the drawings. This will swivelly connect the nut 8 with the lug 5 for a purpose to be hereinafter more fully described.

In operation, when the various parts of the device are assembled as is clearly shown in Fig. 2 of the drawings, it is obvious that the demountable rim 2 will be securely held to the fixed rim of the strip 3, which has a seat on its outer face that securely holds the demountable rim therein. As the strip 3 is secured to the fixed rim 1 there is no possibility of the tire becoming disengaged from the wheel. If only one of the fastening strips is employed, the same is disposed diametrically opposite from the air valve, but any number may be used as is found suitable, they being spaced circumferentially around the wheel. When it is desired to remove the demountable rim and tire carried thereby from the fixed rim, the nut 8 is rotated, in the proper direction, and as the bolt 7 on whose projecting end the nut is mounted, is fixed to the rim 1, it is obvious that the nut 8 being swivelly connected with the lug 5 will move along the projecting end of the bolt and hence move the said lug outwardly. This will cause the strip to move transversely off the fixed rim, and hence remove the demountable rim. This swivel connection of the operating nut 8 with the bolt 7 makes the removal or replacing of the demountable rim carrying strip automatic, and greatly facilitates this operation.

This device forms a very simple and convenient means for connecting demountable rims with the fixed rim of the vehicle wheel. The novel arrangement of parts greatly expedites the removal or placing of the demountable rim upon the wheel, and when in position, securely holds the rim to the wheel and prevents any possibility of accidental disengagement. The extreme simplicity of the construction does not detract from the efficiency and durability of the device as the parts when assembled form a very strong connection, and one which is suitable for the various purposes for which it is employed. The device may be also used on a tire carrier.

From the foregoing description taken in connection with the accompanying drawings, it is thought that a clear and comprehensive understanding of the construction, operation, and advantages of my invention may be had, and while I have shown and described the device as embodying a specific structure, I desire that it be understood, that such changes may be made in said structure as do not depart from the spirit and scope of the invention as claimed.

Having fully described my invention, what I claim as new, and desire to secure by Letters Patent, is:

1. The combination with a wheel having a fixed rim, a demountable rim, and means to secure said demountable rim upon the wheel rim, said means including a demountable rim carrying member interposed between said rims, laterally directed lugs on the carrying member confining the demountable rim against lateral movement with relation to the carrying member, an inwardly extending lug on one terminal of the carrying member disposed laterally of the fixed rim, a bolt carried by the fixed rim extending through the inwardly directed lug, and means associated with the bolt to clamp the lug and carrying member in position upon the fixed rim.

2. A demountable rim fastener including a body member, lugs carried by the body member spaced apart a distance sufficient to receive a demountable rim therebetween and to prevent lateral movement thereof, an angular terminal at one end of the body arranged to overlie a fixed rim, and means to secure the angular terminal to a fixed rim.

3. A demountable rim fastener including a body member adapted to be confined against rotary movement between fixed and demountable rims, said body member having an extended terminal, means to secure the extended terminal in position upon a fixed rim, and lugs carried by the body member arranged apart a sufficient distance to accommodate a demountable rim therebetween and secure such rim against lateral movement.

In testimony whereof I affix my signature hereto.

EDMOND J. BERGMAN.